(12) United States Patent
Malek et al.

(10) Patent No.: US 10,220,709 B2
(45) Date of Patent: Mar. 5, 2019

(54) SOLAR PANEL POWER POINT TRACKER INTEGRATED WITH VEHICLE ELECTRICAL SYSTEM

(71) Applicant: Ford Global Technologies, LLC, Dearborn, MI (US)

(72) Inventors: Hadi Malek, Dearborn, MI (US); Daniel Boston, Dearborn, MI (US); Jacob Mathews, Canton, MI (US); James A. Lathrop, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 216 days.

(21) Appl. No.: 15/486,640

(22) Filed: Apr. 13, 2017

(65) Prior Publication Data

US 2018/0297476 A1    Oct. 18, 2018

(51) Int. Cl.
| | |
|---|---|
| *B60L 1/00* | (2006.01) |
| *B60L 8/00* | (2006.01) |
| *H02J 3/38* | (2006.01) |
| *H02J 7/35* | (2006.01) |

(52) U.S. Cl.
CPC .............. *B60L 8/003* (2013.01); *H02J 3/385* (2013.01); *H02J 7/35* (2013.01); *B60L 2210/10* (2013.01); *B60L 2210/42* (2013.01); *Y02T 10/7083* (2013.01); *Y02T 90/127* (2013.01)

(58) Field of Classification Search
CPC ........................................................ B60L 1/00
USPC ........................................................ 307/10.1
See application file for complete search history.

(56) References Cited

U.S. PATENT DOCUMENTS

| | | | |
|---|---|---|---|
| 6,181,100 B1* | 1/2001 | Shoji ..................... | H02J 7/0047 320/103 |
| 8,035,249 B2 | 10/2011 | Shaver, II et al. | |
| 8,612,075 B2 | 12/2013 | Atluri et al. | |
| 2009/0001926 A1* | 1/2009 | Sato ..................... | B60L 3/0046 320/102 |
| 2010/0213887 A1* | 8/2010 | Louch ..................... | H02J 7/35 320/101 |
| 2011/0162897 A1 | 7/2011 | Syed et al. | |
| 2011/0163710 A1 | 7/2011 | Syed et al. | |

(Continued)

FOREIGN PATENT DOCUMENTS

| | | |
|---|---|---|
| CN | 106300611 A | 1/2017 |
| KR | 1020110004192 A | 1/2011 |

*Primary Examiner* — Adi Amrany
(74) *Attorney, Agent, or Firm* — Frank A. MacKenzie; MacMillan, Sobanski & Todd, LLC

(57) ABSTRACT

A voltage quality module (VQM) function and a solar power generation function are integrated by sharing a single voltage converter (VC) within the electrical system of an automotive vehicle with an electric-start internal combustion engine. The cost of adding solar power generating capabilities to vehicles, the packaging complexities of the systems, and the number of added components are all decreased. The VC can be a DC-DC converter in a boost mode or a buck mode. A switching circuit selectably couples the VC between a main battery and an accessory bus or to between a solar panel and an auxiliary battery. A VC controller regulating a VC output using the main battery to stabilize an accessory bus voltage when in an engine crank mode and otherwise regulating the VC output to match an auxiliary battery voltage using the solar panel output.

16 Claims, 4 Drawing Sheets

(56) References Cited

U.S. PATENT DOCUMENTS

2014/0159478 A1\* 6/2014 Ang .................. B60L 1/00
                                                    307/9.1
2015/0212535 A1   7/2015  Ehlmann et al.
2015/0268687 A1   9/2015  Miyoshi et al.
2016/0297384 A1  10/2016  Guo
2016/0380473 A1  12/2016  Henningson et al.

\* cited by examiner

SOLAR PANEL POWER POINT TRACKER INTEGRATED WITH VEHICLE ELECTRICAL SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to electrical systems for motor vehicles equipped with solar panels for generating electricity, and, more specifically, to variable voltage converters for such systems.

Power generation using solar panels (e.g., photovoltaic arrays) has received increasing attention in the automotive industry due to their dropping price and improved efficiency levels now available. Solar panels can be attached to a vehicle roof or can be used to replace a moon-roof or sun-roof, for example. Electricity generated by the panels can be used to charge an onboard battery (such as an auxiliary battery, an electric vehicle's high voltage battery, or the main 12V battery of a gasoline-powered vehicle). A charge controller (e.g., a Maximum Power Point Tracking, or MPPT, controller) is used to ensure that a maximum amount of power is transferred from the solar panel to the load (e.g., battery being charged). More specifically, it is known that to deliver maximum power to a load, the power source (including solar panels) should have the same internal impedance as the impedance of the load. An MPPT module typically includes a DC-to-DC voltage converter (VC) placed between the photovoltaic (PV) array and the battery load. By converting the PV output voltage to the battery voltage, the VC presents an ideal load to the PV array allowing it to operate at its optimum voltage and maximum power transfer. Generally, the DC-DC regulator (converter) in MPPT charge controllers can be a boost, buck, buck-boost, SEPIC or any other type of converter. The proper topology can be selected based on the output voltage of solar panel and input voltage of the load. Two of the most popular types of converters which have been employed for MPPT are boost converter and buck converters.

Depending upon the relative magnitudes of the PV and battery voltages, up to one-half of the generated power would be lost if a voltage converter was not used. However, the MPPT module results in a significant increase in the overall cost of a solar charging system.

SUMMARY OF THE INVENTION

In one aspect of the invention, apparatus is provided for a vehicle with an electric-start internal combustion engine. A DC accessory bus is configured to connect to a plurality of electrical accessories. A primary DC bus is adapted to connect to a main DC battery and to an electric starter for the engine. A voltage quality unit includes a voltage converter configured to convert a voltage on the primary DC bus to a stabilized voltage on the DC accessory bus during a starting operation of the electric starter. The voltage quality unit includes bypass switches for connecting the primary DC bus to the DC accessory bus when the electric starter is not in the starting operation. A solar panel generates an output voltage at a panel output. The bypass switches further connect the voltage converter between the panel output and an auxiliary load when the electric starter is not in the starting operation. The voltage converter converts the solar panel output voltage to an optimized voltage that optimizes power transfer to the auxiliary load.

DETAILED DESCRIPTION OF PREFERRED EMBODIMENTS

The present invention combines a voltage stabilizing system (e.g., a voltage quality module, or VQM) with a solar power generation system to better utilize hardware components in a vehicle which has an electric-start internal combustion engine (ICE). A voltage converter in a conventional VQM is only used for short periods of time (e.g., during engine cranking) and is otherwise idle. A voltage converter included in a maximum power point tracker (MPPT) for solar panel is active for long periods of time, even when the vehicle is parked and unattended. Even though the input and output voltage levels and the dynamic control needs for the DC- DC voltage converter of the VQM and the MPPT are difference, the invention successfully configures a single converter to satisfy both systems. The invention reduces the number of components required for a solar panel equipped vehicle, improves efficiency, decreases the overall weight of the two systems, and reduces the overall cost and packaging complexity.

A voltage converter/stabilization circuit compatible with the requirements for both subsystems can be arrived at in at least two different ways. In one scenario, since typical designs of a VQM function over certain voltage and current ranges, a solar panel system can be arranged in such a way that it provides an output matching these voltage and current ratings. In that case, the voltage converter of the VQM can be used as a MPPT charge controller without any modification. In a second scenario, the circuitry and control strategy of a VQM can be designed to be adaptable to different design architectures of the solar panel system (e.g., settable to different voltages and currents), while retaining its ability to perform across the required voltage and current ranges during cranking.

Figure 1:
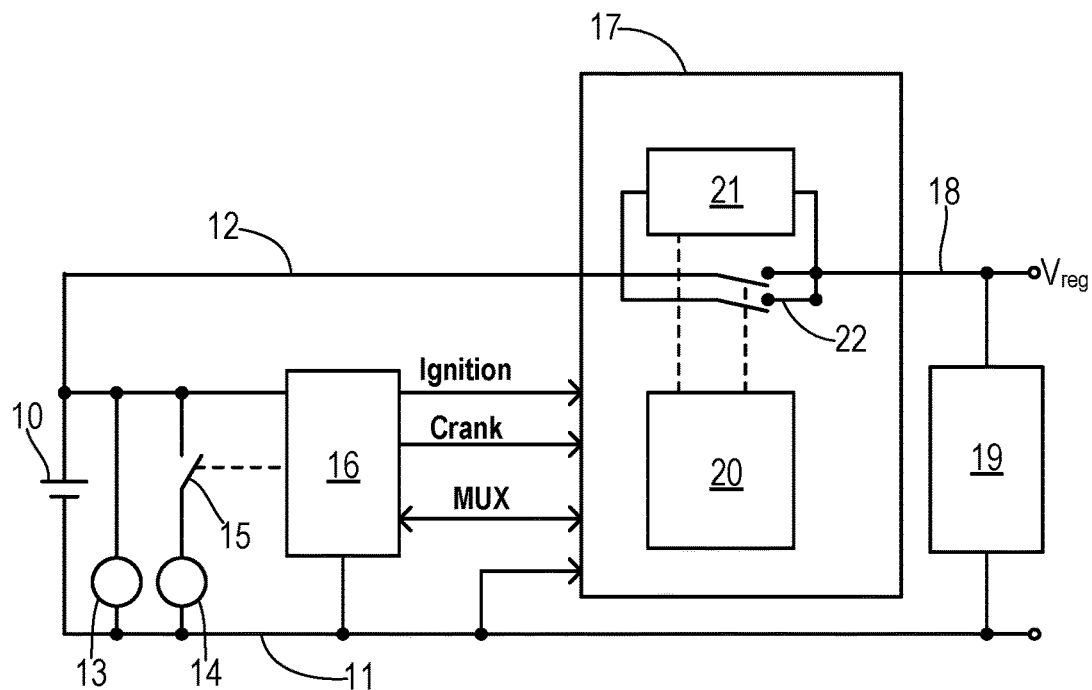
FIG. 1 is a block diagram showing a typical vehicle electrical system with a voltage quality module.

Operation of a conventional voltage quality module will be described with reference to FIGS. 1-3. A typical vehicle electrical system in FIG. 1 includes a main battery 10 connected between ground 11 and a primary DC bus 12. An alternator/generator 13 driven by an internal combustion engine (not shown) charges battery 10 during engine operation. An electric starter motor 14 is selectably connected to main battery 10 by a relay switch 15 in order to crank (i.e., start) the combustion engine. A master engine control unit (ECU) 16 controls the state of switch 15 in response to a manual ignition switch or a remote start signal, for example.

ECU 16 is connected to a control section 20 in VQM 17 via a multiplex bus (MUX) and by signal lines carrying Ignition status and Crank status signals, for example. Primary DC bus 12 is connected to an input of a voltage converter (VC) 21 and a bypass relay switch 22. The outputs of VC 21 and bypass relay 22 are connected to a DC accessory bus 18 that supplies a plurality of electrical accessories 19, such as an audio system, cellular phone system, navigation system, driver information/display system, lighting devices, or other electronic devices. Control section 20 sets that state of bypass relay 22 and provides command signals to control VC 21 based on whether an engine cranking event is underway. When relay 22 is closed by control section 20 (e.g., a vehicle ignition switch is in the On or Accessory position), then VC 21 is deactivated and main battery 10 directly supplies the main system voltage (e.g., 12 volts) to bus 18. During cranking, control section 20 opens relay 22 and activates VC 21 using a variable duty cycle that is dynamically controlled to continue to supply a regulated voltage $V_{reg}$ (e.g., 12 volts) to bus 18.

Figure 2:
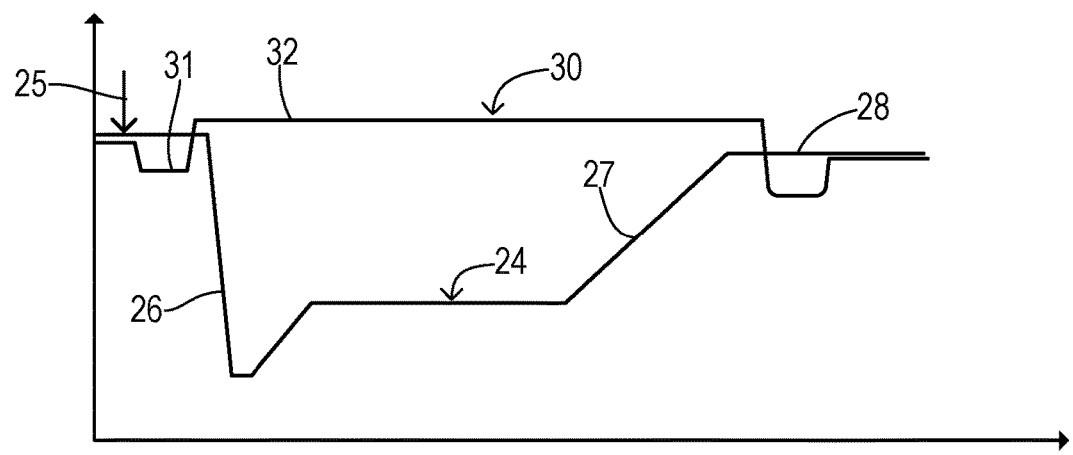
FIG. 2 is a voltage plot showing main battery voltage and accessory bus voltage during an engine cranking event.

FIG. 2 compares a main battery voltage trace 24 and a voltage converter output voltage trace 30 during a cranking event. An engine start signal is generated at an instant 25. The engine starter motor is energized after a brief delay resulting in a drop-off 26 in the voltage available at primary DC bus 12. During the delay, VQM 17 transitions at 31 from the bypass mode to a boost mode in order to begin to generate a stabilized voltage $V_{reg}$ at 32 and relay 22 is opened. Eventually the power drain from the starter motor decreases and the battery voltage on bus 12 recovers at 27 until being fully recovered along line 28. Relay 22 can then be closed and VC 21 is deactivated.

Figure 3:
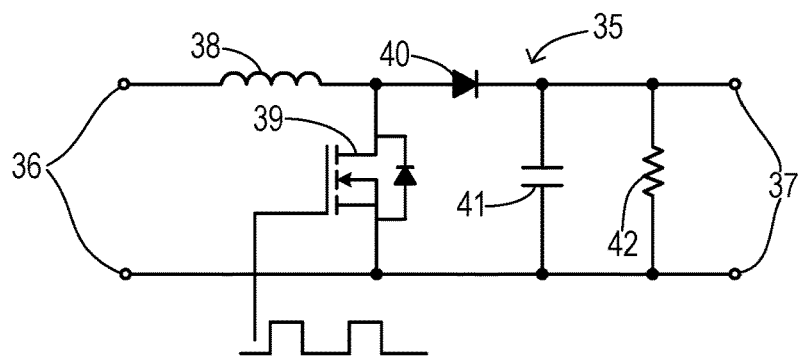
FIG. 3 is a schematic diagram of one embodiment of a conventional DC- DC converter.

To provide boost conversion for VC 21, FIG. 3 shows an example topology for a DC-DC converter 35 that receives a variable DC voltage from the main battery at inputs 36 and provides regulated voltage $V_{reg}$ at outputs 37. An inductor 38 stores energy when a switch (e.g., MOSFET) 39 is ON and then transfers the energy via a diode 40 to a capacitor 41 and resistor 42 when switch 39 is OFF. By modulating the duty cycle of switch 39 (e.g., using voltage feedback in the control section) the amount of transferred energy, and thus the output voltage, can be controlled.

Figure 4:
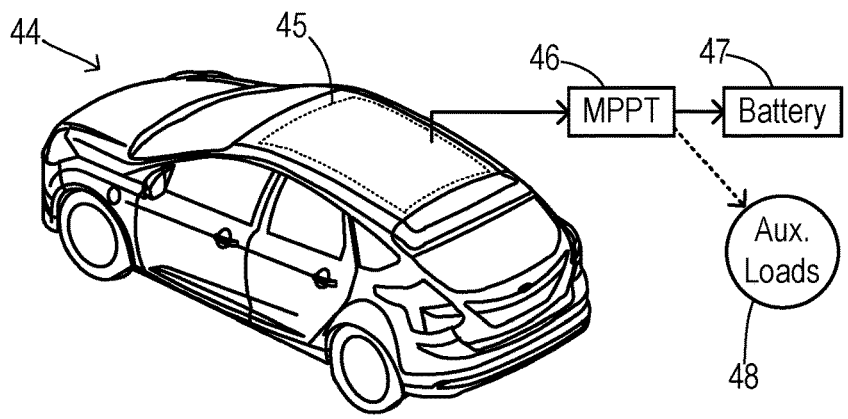
FIG. 4 is a block diagram showing one embodiment of a vehicle having a solar power generating system.

Turning to a typical vehicle system for generating and storing electrical energy using solar cells, FIG. 4 shows a vehicle 44 with a roof-mounted solar panel 45. A Maximum Power Point Tracking (MPPT) charge controller 46 can be connected to recharge a battery 47 (which can be the main vehicle battery, in which case it might only be recharged when the vehicle is not in use) or connected to auxiliary loads 48 (which can include an auxiliary battery capable of being continuously recharged). Auxiliary loads 48 can include DC loads driven from DC power or can include a DC-AC converter (i.e., an inverter) driving AC loads.

Figure 5:
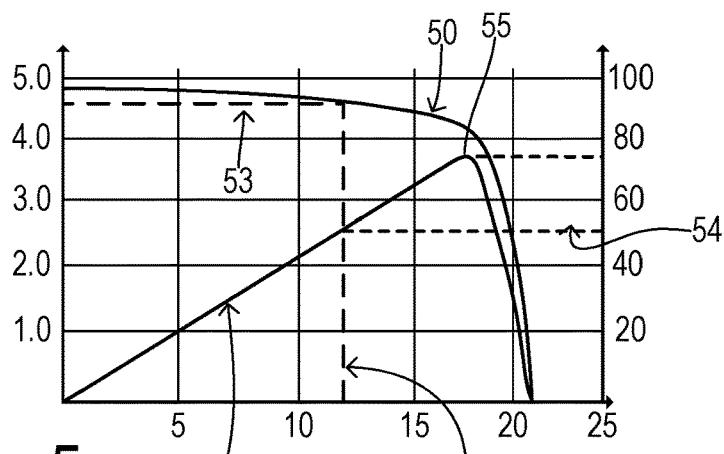
FIG. 5 is a plot demonstrating the need for voltage conversion to maximize power transfer from a solar panel to a load.
Figure 6:
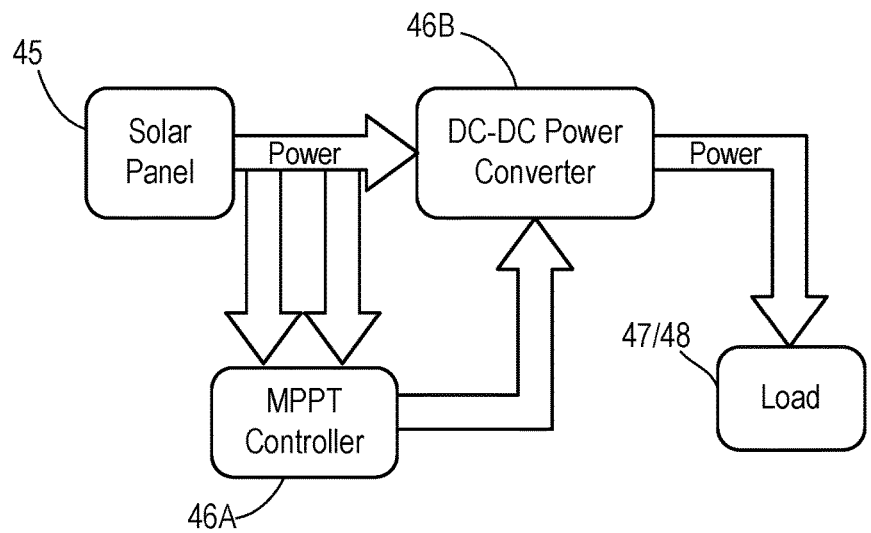
FIG. 6 is a block diagram of one embodiment of a conventional solar power generation system with power point tracking.

FIG. 5 shows a power transfer characteristic 50 for a typical solar panel wherein the DC current flow from the panel is plotted against the terminal voltage of the battery under charge. In this example, the solar panel is rated at 17 Volts and 4.4 Amps (i.e., a maximum power of 75 Watts). A curve 51 shows the actual power transferred to a battery load for different battery voltages. A peak power transfer occurs at point 55 where the battery load voltage matches the nominal voltage of the solar panel (e.g., at about 17 Volts in this example). If an unmodified solar panel output was used to charge a typical automobile battery of 12 Volts as shown at 52, then a high current is obtained from the solar panel at 53 but a non-optimal power transfer shown at 54 is obtained. A load voltage corresponding to point 55 would instead deliver a maximum power to the load. Consequently, a DC-DC voltage converter has been used in order to present an optimized load to the solar panel while delivering the correct voltage to the load. The voltage converter introduces its own internal losses, but these are typically much less than the power lost without conversion. As shown in FIG. 6, charge controller 46 preferably includes an MPPT controller 46A and a DC-DC converter 46B. For a fixed load and fixed solar panel configuration, MPPT controller 46A can also be fixed (i.e., nonadaptive). In the event that the load voltage or the solar panel configuration is variable, MPPT controller 46B can use adaptive feedback. In a typical vehicle system, MPPT controller 46A may be fixed and the voltage may be stepped down from a higher solar panel voltage to a lower battery voltage.

Since the boost converter (i.e., stabilization circuit) in a VQM system is used only during cranking events of the vehicle (usually only 5 seconds at a time) and considering similarities between VQM and MPPT hardware (e.g., both use DC-DC converters), the invention integrates these separate systems in order to share a single voltage converter. This reduces the costs of adding solar power generating capabilities to vehicles by decreasing the packaging complexities of the system and decreasing the number of added components.

Figure 7:
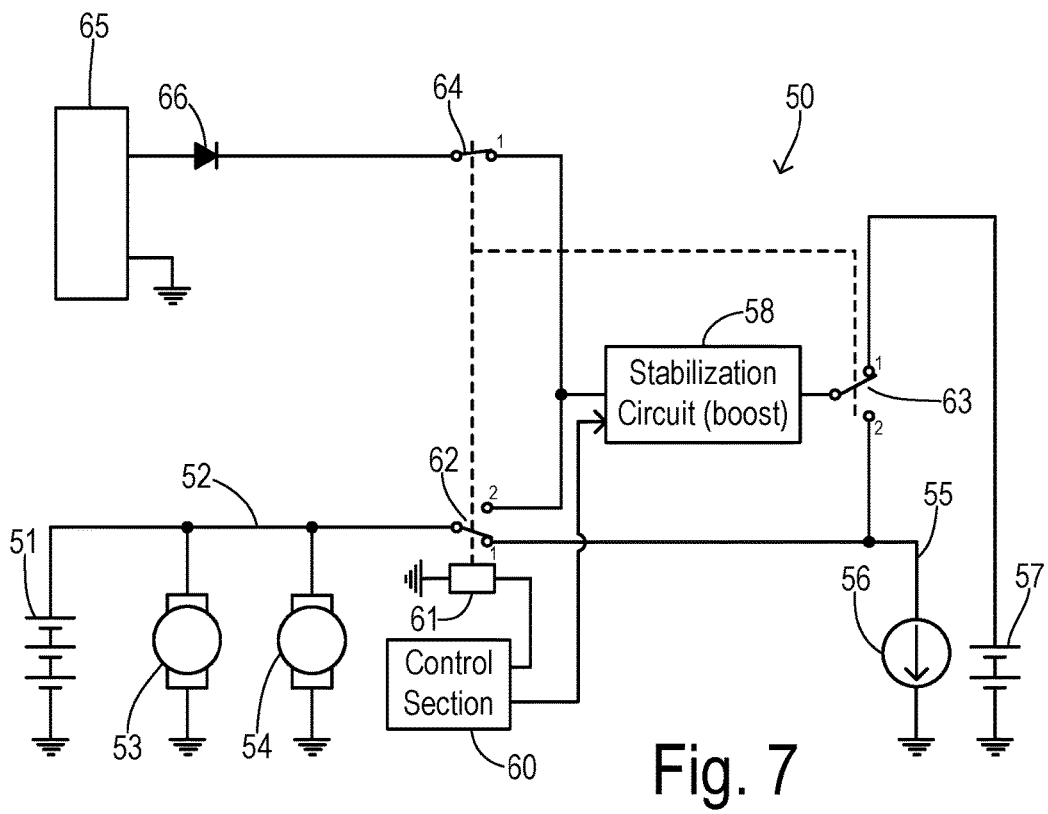
FIG. 7 is a block diagram showing a first embodiment of the invention wherein a voltage converter is shared between a voltage stabilization/quality system and a solar power generating system.

FIG. 7 shows a first embodiment of an apparatus 50 for combining voltage stabilization and solar power generation in a motor vehicle with an electric-start internal combustion engine. A main battery 51 powers a primary DC bus 52 to continuously interface with an alternator/generator 53 and a starter motor 54. A DC accessory bus 55 connects to a plurality of electrical accessories 56 all configured to operate off of a nominal battery voltage. Thus, proper operation of accessories 56 would be disrupted during the natural voltage drop-off during a cranking event if they only depended on main battery 51 for supplying power.

Vehicle apparatus 50 includes an auxiliary battery 57 for storing energy from solar power generation. Instead of or in addition to battery 57, other DC loads (or AC loads with one of the DC loads being a DC-AC inverter) can be supplied using the solar power. A stabilization circuit 58 (e.g., a boost converter) has an output selectably connected to either electrical accessories 56 or auxiliary battery 57. A control section 60 is connected to stabilization circuit 58 and to a control input 61 (e.g., a magnetic solenoid) of a relay switch with controlled switching elements 62, 63, and 64. Switching element 62 selectively connects primary DC bus 52 to either electrical accessories 56 or an input of stabilization circuit 58. Switching element 63 selectively connects an output of stabilization circuit 58 to either electrical accessories 55 or auxiliary battery 57. Switching element 64 is an optional feature that can be used for selectively connecting solar panel 65 and diode 66 to the input of stabilization circuit 58.

The embodiment in FIG. 7 is particularly adapted to use a stabilization circuit 58 with a voltage converter which is unmodified from a typical VQM system. More specifically, FIG. 7 is adapted to operate stabilization circuit 58 as a boost converter. In order to employ boost conversion, the output voltage of solar panel 65 needs to be less than the stabilized voltage that is provided to electrical accessories 56 during the cranking phase. In addition, it is convenient if the nominal voltage of auxiliary battery 57 is designed to be the same voltage (e.g., 12 Volts) so that stabilization circuit 58 always regulates to the same target voltage. Nevertheless, a different voltage could be used for the auxiliary battery and target voltage for solar charging if desired. Relay switching elements 62 and 63 have positions labeled 1 and 2. In position 1 (when the engine starter motor is not in a starting operation), a bypass state is obtained for the VQM function so that stabilization circuit 58 is connected between solar panel 65 and auxiliary battery 57 and primary DC bus 52 is connected to electrical accessories 55. During a cranking event, bypass switch elements 62 and 63 are in position 2 wherein stabilization circuit 58 is connected between primary DC bus 52 and accessory bus 55. Thus, when the electric starter is in the starting operation, energy from solar panel 65 is not utilized. When switching element 62 is in position 2, switching element 64 may be open in order to isolate solar panel 65. However, switching element 64 may not be necessary in some embodiments since diode 66 would usually be either be reverse biased so that no current flows from solar panel 65 or any current flowing would be sufficiently small that it would not be detrimental to system operation.

The constraint in this embodiment that the output voltage from solar panel 65 has to be compatible with stabilization circuit 58 being a boost converter is easily satisfied by arranging solar panel 65 to supply a voltage lower than the voltage needed by the charging (auxiliary) load. For example, if the voltage of auxiliary battery 57 is 12 V, the individual solar cells contained on a solar panel can be interconnected to provide a voltage less than 12 V. For example, in a solar panel containing 60 solar cells wherein each cell has a nominal output voltage of 0.5 V, the cells could be connected in various series and parallel branches to produce an appropriate voltage. A layout with 3 branches connected in parallel wherein each branch contains 20 solar cells results in a solar panel with an output of 10 V. During solar charging, boost converter 58 converts the 10 V solar panel output to an optimized voltage of 12 V for transferring power to auxiliary battery 57.

Figure 8:
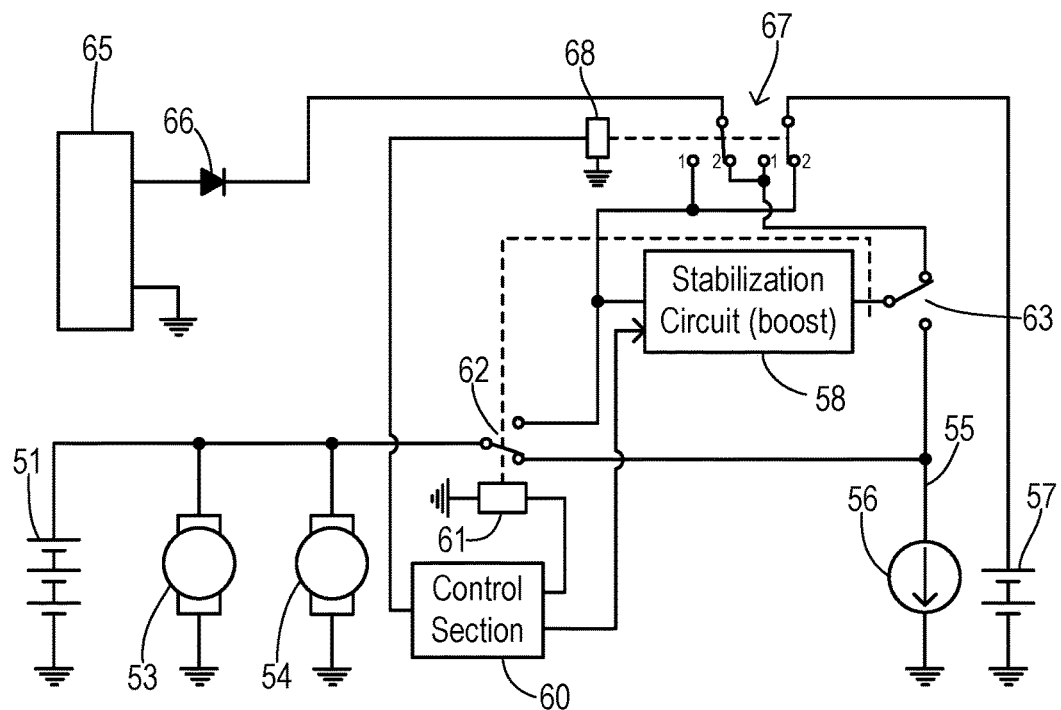
FIG. 8 is a block diagram showing a second embodiment of the invention wherein a voltage converter is configured to operate as either a boost converter or a buck converter.

A more generalized embodiment of the invention is shown in FIG. 8 wherein it is not necessary for the voltage from the solar panel to be smaller than the target charging voltage for the auxiliary load (e.g., auxiliary battery, DC loads, or DC-AC voltage converter with AC loads). In this case, additional relay switching elements 67 are added as a double pole double throw (DPDT) relay which reverses the power flow direction through stabilization circuit 58 when connected between solar panel 65 and auxiliary battery 57. A magnetic actuator 68 moves elements 67 between positions 1 and 2 according to a control signal from control section 60. Using reversal, stabilization circuit 58 can operate as a boost converter during an engine starting operation in order to stabilize the diminished main battery voltage and operate as a buck converter when not in the starting operation in order to reduce an output voltage from solar panel 65 to a lower voltage of auxiliary battery 57. The embodiment in FIG. 8 can be programmable in order to adapt a particular module design to work in systems having different voltage levels (e.g., whether the solar panel voltage is greater than or less than the voltage of the auxiliary load).

Figure 9:
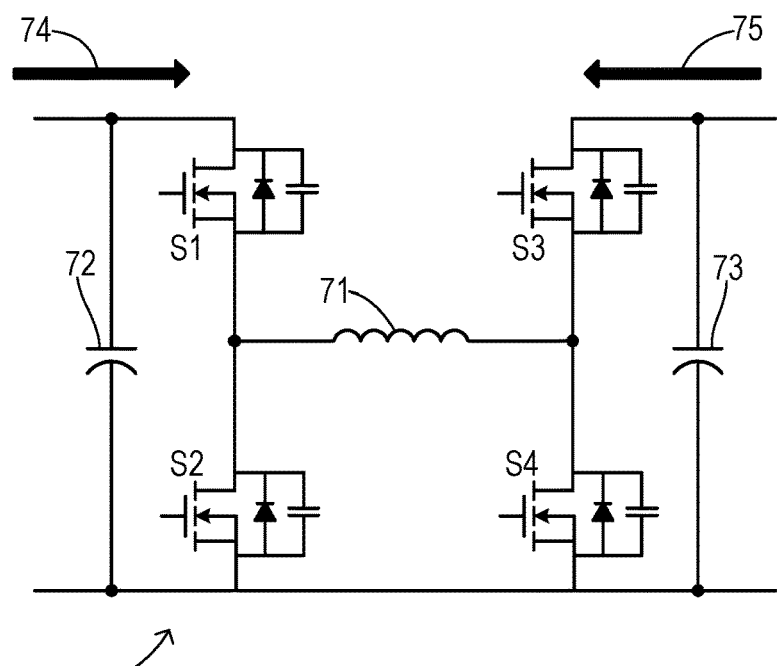
FIG. 9 is a schematic diagram showing one preferred embodiment of a voltage converter useful in the embodiment of FIG. 8.

FIG. 9 provides a circuit topology for a DC-DC converter 70 with selective buck and boost operational modes for both directions of power flow through the unit. An inductor 71 is connected in an H-bridge configuration with switching devices (e.g., MOSFETs) S1-S4. A left-side smoothing capacitor 72 and a right-side smoothing capacitor 73 can each be either an input or an output of converter 70 depending on a selected power flow 74 or 75.

With the voltage source (i.e., main battery or solar panel) connected to the left side and the auxiliary load connected to the right side of converter 70, gate switching signals can be provided that turn S3 continuously ON, S4 continuously OFF, and modulate S1 and S2 OFF and ON to create a synchronous buck converter wherein power flows from left to right. Alternatively, S1 can be switched continuously ON, S2 continuously OFF, and S3 and S4 modulated OFF and ON to obtain a synchronous boost converter also having power flow from left to right.

With the voltage source (i.e., main battery or solar panel) connected to the right side and the auxiliary load connected to the left side of converter 70, gate switching signals can be provided that turn S1 continuously ON, S2 continuously OFF, and modulate S3 and S4 OFF and ON to create a synchronous buck converter wherein power flows from right to left. Alternatively, S3 can be switched continuously ON, S4 continuously OFF, and S1 and S2 modulated OFF and ON to obtain a synchronous boost converter also having power flow from right to left.

What is claimed is:

1. Apparatus for a vehicle with an electric-start internal combustion engine, comprising:
    a DC accessory bus configured to connect to a plurality of electrical accessories;
    a primary DC bus adapted to connect to a main DC battery and to an electric starter for the engine;
    a voltage quality unit including a voltage converter configured to convert a voltage on the primary DC bus to a stabilized voltage on the DC accessory bus during a starting operation of the electric starter, wherein the voltage quality unit includes bypass switches for connecting the primary DC bus to the DC accessory bus when the electric starter is not in the starting operation; and
    a solar panel generating an output voltage at a panel output;
    wherein the bypass switches further connect the voltage converter between the panel output and an auxiliary load when the electric starter is not in the starting operation, and wherein the voltage converter converts the solar panel output voltage to an optimized voltage that optimizes power transfer to the auxiliary load.

2. The apparatus of claim 1 wherein the stabilized voltage is a predetermined nominal voltage of the main DC battery.

3. The apparatus of claim 1 wherein the voltage converter is a boost converter.

4. The apparatus of claim 1 wherein the auxiliary load is comprised of an auxiliary battery that is charged by the solar panel, and wherein the optimized voltage is a predetermined nominal voltage of the auxiliary battery.

5. The apparatus of claim 1 wherein the auxiliary load is comprised of at least one DC load.

6. The apparatus of claim 5 wherein the DC load includes a DC-AC inverter providing AC power to an AC load.

7. The apparatus of claim 1 further comprising a controller configured to a) detect the starting operation, b) set the bypass switches via at least one magnetic relay, and c) control a duty cycle of the voltage converter to regulate the stabilized voltage and the optimized voltage, respectively.

8. The apparatus of claim 1 further comprising a flow reversal switch interconnecting the solar panel, voltage converter, and auxiliary load to select either a boost mode or a buck mode of the voltage converter as necessary to produce the optimized voltage.

9. An automotive electrical system, comprising:
    a DC-DC converter;
    a switching circuit selectably coupling the converter between a main battery and an accessory bus during an engine crank mode or otherwise between a solar panel and an auxiliary battery; and
    a controller regulating a converter output using the main battery to stabilize an accessory bus voltage during crank mode and otherwise using the solar panel to match a voltage of the auxiliary battery.

10. The system of claim 9 wherein the accessory bus voltage is stabilized at a predetermined nominal voltage of the main battery.

11. The system of claim 9 wherein the converter is a boost converter.

12. The system of claim 9 the controller is configured to a) detect the engine crank mode, b) set the switching circuit via at least one magnetic relay, and c) control a duty cycle of the converter to regulate the accessory bus voltage and the matching voltage, respectively.

13. The system of claim 9 further comprising a flow reversal switch interconnecting the solar panel, converter, and auxiliary battery to select either a boost mode or a buck mode of the converter as necessary to produce the matching voltage.

14. A control method for a voltage converter (VC) in a combustion vehicle, comprising:
    converting solar power from a solar panel to an optimized voltage for charging an auxiliary battery;
    detecting cranking of a starter in the vehicle;
    during cranking, disconnecting the VC from the solar panel and converting a main battery power to a predetermined bus voltage for powering electrical accessories; and
    after cranking, reconnecting the VC to the solar panel and auxiliary battery.

15. The method of claim 14 wherein during cranking the VC is connected to provide a power flow in a first direction through the VC, and wherein the VC is connected to provide a power flow in an opposite direction through the VC during conversion of solar power.

16. The method of claim 14 wherein an input of the VC is switched to the main battery during cranking and switched to the solar panel otherwise.

* * * * *